United States Patent
Jiang et al.

(10) Patent No.: US 11,934,954 B2
(45) Date of Patent: Mar. 19, 2024

(54) PURE INTEGER QUANTIZATION METHOD FOR LIGHTWEIGHT NEURAL NETWORK (LNN)

(71) Applicant: SHANGHAITECH UNIVERSITY, Shanghai (CN)

(72) Inventors: Weixiong Jiang, Shanghai (CN); Yajun Ha, Shanghai (CN)

(73) Assignee: SHANGHAITECH UNIVERSITY, Shanghai (CN)

( * ) Notice: Subject to any disclaimer, the term of this patent is extended or adjusted under 35 U.S.C. 154(b) by 0 days.

(21) Appl. No.: 17/799,933

(22) PCT Filed: Sep. 22, 2021

(86) PCT No.: PCT/CN2021/119513
§ 371 (c)(1),
(2) Date: Aug. 16, 2022

(87) PCT Pub. No.: WO2022/222369
PCT Pub. Date: Oct. 27, 2022

(65) Prior Publication Data
US 2023/0196095 A1   Jun. 22, 2023

(30) Foreign Application Priority Data

Apr. 20, 2021   (CN) .......................... 202110421738.5

(51) Int. Cl.
*G06N 3/08*   (2023.01)
(52) U.S. Cl.
CPC ...................... *G06N 3/08* (2013.01)
(58) Field of Classification Search
CPC .................. G06N 3/07; G06N 3/08
See application file for complete search history.

(56) References Cited

U.S. PATENT DOCUMENTS 10,527,699 B1    1/2020  Cheng et al.
2019/0042948 A1*  2/2019  Lee ................... H03M 7/24
(Continued)

FOREIGN PATENT DOCUMENTS

CN    105528589 A    4/2016
CN    110930320 A    3/2020
(Continued)

OTHER PUBLICATIONS

Cho et al. (Per-channel Quantization Level Allocation for Quantizing Convolutional Neural Networks, Nov. 2020, pp. 1-3) (Year: 2020).*

(Continued)

*Primary Examiner* — George Giroux
(74) *Attorney, Agent, or Firm* — Bayramoglu Law Offices LLC

(57) ABSTRACT

A pure integer quantization method for a lightweight neural network (LNN) is provided. The method includes the following steps: acquiring a maximum value of each pixel in each of the channels of the feature map of a current layer; dividing a value of each pixel in each of the channels of the feature map by a t-th power of the maximum value, $t \in [0,1]$; multiplying a weight in each of the channels by the maximum value of each pixel in each of the channels of the corresponding feature map; and convolving the processed feature map with the processed weight to acquire the feature map of a next layer. The algorithm is verified on SkyNet and MobileNet respectively, and lossless INT8 quantization on SkyNet and maximum quantization accuracy so far on MobileNetv2 are achieved.

2 Claims, 1 Drawing Sheet

(56) References Cited

U.S. PATENT DOCUMENTS

| | | | |
|---|---|---|---|
| 2019/0279072 A1* | 9/2019 | Gao | G06N 3/08 |
| 2019/0294413 A1 | 9/2019 | Vantrease et al. | |
| 2020/0401884 A1* | 12/2020 | Guo | G06N 3/08 |
| 2021/0110236 A1 | 4/2021 | Shibata | |
| 2022/0086463 A1* | 3/2022 | Coban | G06N 3/045 |

FOREIGN PATENT DOCUMENTS

| | | | |
|---|---|---|---|
| CN | 111311538 A | 6/2020 | |
| CN | 111402143 A | 7/2020 | |
| CN | 111937010 A | 11/2020 | |
| CN | 112418397 A | 2/2021 | |
| CN | 112488070 A | 3/2021 | |
| CN | 112560355 A | 3/2021 | |
| CN | 113128116 A | 7/2021 | |
| WO | WO-0074850 A2 * | 12/2000 | G01N 27/44769 |
| WO | WO-2005048185 A1 * | 5/2005 | G06N 3/0436 |
| WO | 2018073975 A1 | 4/2018 | |

OTHER PUBLICATIONS

Kang et al. (Decoupling Representation and Classifier for Long-Tailed Recognition, Feb. 2020, pp. 1-16) (Year: 2020).*
Polino et al. (Model Compression via Distillation and Quantization, Feb. 2018, pp. 1-21) (Year: 2018).*
Benoit Jacob, et al., Quantization and Training of Neural Networks for Efficient Integer-Arithmetic-Only Inference, IEEE, 2018, pp. 2704-2713.
Raghuraman Krishnamoorthi, Quantizing deep convolutional networks for efficient inference: A whitepaper, 2018, pp. 1-36.
Markus Nagel, et al., Data-Free Quantization Through Weight Equalization and Bias Correction, Qualcomm AI Research, 2019.
Liu Guanyu, et al., Design and implementation of real-time defogging hardware accelerator based on image fusion, Hefei University of Technology, Master's Dissertation, 2020, pp. 1-81.

* cited by examiner

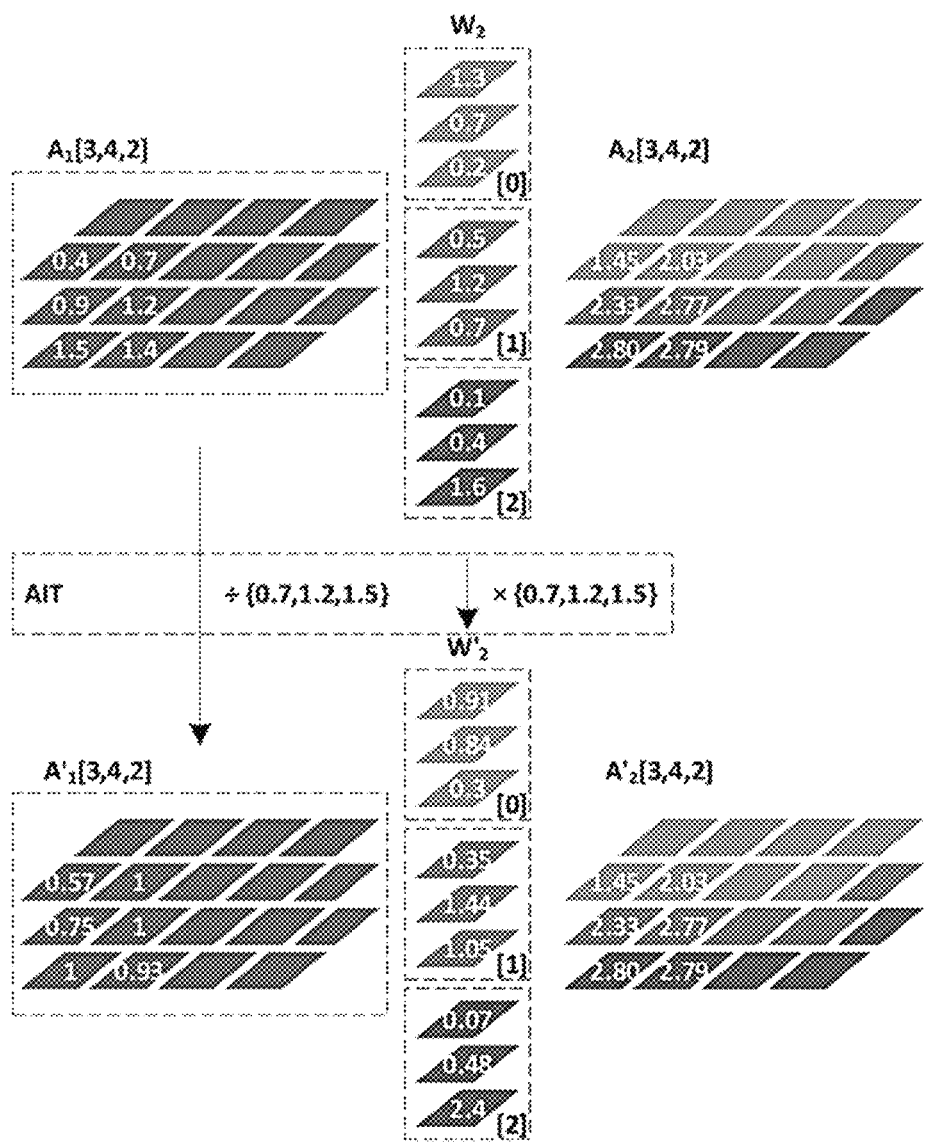

PURE INTEGER QUANTIZATION METHOD FOR LIGHTWEIGHT NEURAL NETWORK (LNN)

CROSS REFERENCE TO THE RELATED APPLICATIONS

This application is the national phase entry of International Application No. PCT/CN2021/119513, filed on Sep. 22, 2021, which is based upon and claims priority to Chinese Patent Application No. 202110421738.5, filed on Apr. 20, 2021, the entire contents of which are incorporated herein by reference.

TECHNICAL FIELD

The present invention relates to a quantization method for a lightweight neural network (LNN).

BACKGROUND

Recently, a great deal of work has explored quantization techniques for traditional models. However, when these techniques are applied to lightweight networks, there will be a large loss of accuracy. For example, when MobileNetv2 is quantized, the accuracy of the ImageNet dataset drops from 73.03% to 0.1% (Jacob Benoit et al. *Quantization and Training of Neural Networks for Efficient Integer-Arithmetic-Only Inference*. IEEE Conference on Computer Vision and Pattern Recognition (CVPR). 2018: pp. 2,704-2,713). In another example, a 2% loss of accuracy is caused (Raghura Krishnamoorthi. *Quantizing Deep Convolutional Networks for Efficient Inference: A Whitepaper*. CoRR, abs/1806.08342, 2018). To recover these losses of accuracy, much work opts for retraining or training-time quantization techniques. But these techniques are time-consuming and require dataset support. To solve these problems, Nagel et al. proposed a data-free quantization (DFQ) algorithm. They attributed the poor performance of traditional quantization methods on models adopting depthwise separable convolutions (DSCs) to differences in weight distribution. For that, they proposed cross-layer weight balance to adjust the balance of weights between different layers. This technique is only applicable to network models using the rectified linear unit (ReLU) as an activation function. However, currently, most lightweight networks use ReLU6. If ReLU6 is directly replaced by ReLU, it will cause a significant loss of accuracy. Furthermore, the method proposed by Nagel et al. is not suitable for pure integer quantization.

SUMMARY

The technical problems to be solved by the present invention are that: A simple combination of a lightweight neural network (LNN) and a quantization technique will lead to a significantly reduced accuracy or a longer retraining time. In addition, currently, many quantization methods only quantize the weights and feature maps, but the offset and quantization coefficients are still floating-point numbers, which is not beneficial to the application specific integrated circuit (ASIC) field-programmable gate array (FPGA).

In order to solve the above technical problems, the present invention adopts the following technical solution: a pure integer quantization method for an LNN, including the following steps:

step 1: supposing that one feature map has N channels, N≥1, and acquiring a maximum value of each pixel in each of the channels of the feature map of a current layer;

step 2: processing each pixel in each of the channels of the feature map as follows:

dividing a value of each pixel in an n-th channel of the feature map by a t-th power of a maximum value in the n-th channel acquired in step 1, t∈[0,1]; and acquiring N groups of weights corresponding to the N channels of the feature map of a next layer, each of the groups of weights being composed of N weights corresponding to the N channels of the feature map of the current layer, and processing each of the groups of weights as follows:

multiplying the N weights in an n-th group respectively by the maximum value of each pixel in the N channels acquired in step 1; and step 3: convolving the feature map processed in step 2 with the N groups of weights processed in step 2 to acquire the feature map of the next layer.

Preferably, when t=0, no imbalance transfer is performed; and when t=1, all imbalances between the channels of the feature map of the current layer are transferred to the weights of the next layer.

Preferably, the current layer is any layer except a last layer in the LNN.

The algorithm provided by the present invention is verified on SkyNet and MobileNet respectively, and lossless INT8 quantization on SkyNet and maximum quantization accuracy so far on MobileNetv2 are achieved.

BRIEF DESCRIPTION OF THE DRAWINGS

The FIGURE is a schematic diagram of an imbalance transfer for 1×1 convolution.

DETAILED DESCRIPTION OF THE EMBODIMENTS

The present invention will be described in detail below with reference to specific embodiments. It should be understood that these embodiments are only intended to describe the present invention, rather than to limit the scope of the present invention. In addition, it should be understood that various changes and modifications may be made on the present invention by those skilled in the art after reading the content of the present invention, and these equivalent forms also fall within the scope defined by the appended claims of the present invention.

The analysis and modeling of the quantization process of a neural network shows that the balance of a tensor can be used as a predictive index of a quantization error. Guided by this predictive index, the present invention proposes a tunable imbalance transfer algorithm to optimize the quantization error of a feature map, the specific contents are as follows:

In the current neural network computing mode, weights can be quantized channel by channel, but the feature maps can only be quantized layer by layer. Therefore, the quantization error of the weights is small, but the quantization error of the feature maps is large.

The present invention divides a value of each pixel in each of the channels of the feature map of a current layer in a neural network by a maximum value of each pixel in the channel, and then performs quantization to achieve equivalent channel-by-channel quantization. In order to ensure that the calculation result remains unchanged, for weights convolved with the feature map, the value of each of the channels is multiplied by the maximum value of each pixel in the channel of the corresponding feature map. As a result, the imbalances between the channels of the feature map of the current layer are all transferred to the weights of the next layer.

However, in fact, it is not the optimal solution to transfer all the imbalances between the channels of the feature map. In order to tune the level of the imbalance transfer, the present invention additionally adds a hyperparameter imbalance transfer coefficient t. In the above steps, the value of each pixel in each of the channels of the feature map is divided by the t-th power of the maximum value of each pixel in the channel, where t ranges from 0 to 1. When t=0, no imbalance transfer is performed. When t=1, all the imbalances are transferred as mentioned above. By tuning t, the present invention can obtain optimal quantization accuracy. This operation is applicable to any network model and any convolution kernel size.

The FIGURE shows an imbalance transfer for 1×1 convolution. The dotted tensors share the same quantization coefficients. The value of each pixel in each of the channels of A1 is divided by the maximum value of each pixel in the channel, and the corresponding channel of W2 is multiplied by this maximum value. This operation ensures that the calculation result remains unchanged, but the balance of A1 is greatly increased, and simultaneously, the balance of the weights is not decreased significantly. Therefore, the quantization error of the feature map can be reduced, so as to improve the accuracy of the model after quantization.

What is claimed is:

1. A pure integer quantization method for implementing a lightweight neural network (LNN) in an application specific integrated circuit (ASIC) or a field-programmable gate array (FPGA), comprising the following steps:

step 1: setting, by the ASIC or FPGA, a feature map with N channels, N≥1, and acquiring a maximum value of each pixel in each of N channels of a first feature map of a current layer;

step 2: processing, by the ASIC or FPGA, each pixel in each of the N channels of the first feature map as follows:

dividing, by the ASIC or FPGA, a value of each pixel in au n-th channel of the first feature map by a t-th power of a maximum value in the n-th channel acquired in step 1, t∈[0,1]; and acquiring, by the ASIC or FPGA, N groups of weights corresponding to N channels of a second feature map of a next layer, wherein each of the N groups of the weights comprises N weights corresponding to the N channels of the first feature map of the current layer, and processing each of the N groups of the weights as follows:

multiplying, by the ASIC or FPGA, the N weights in an n-th group respectively by the maximum value of each pixel in the N channels acquired in step 1;

step 3: convolving, by the ASIC or FPGA, the first feature map processed in step 2 with the N groups of the weights processed in step 2 to acquire the second feature map of the next layer; and step 4: obtaining by the ASIC or FPGA, a quantization accuracy based on a result of step 3, and tuning, by the ASIC or FPGA, the t value to obtain a maximum quantization accuracy.

2. The pure integer quantization method for the LNN according to claim 1, wherein the current layer is any layer except a last layer in the LNN.

* * * * *